United States Patent
Yamaguchi et al.

(10) Patent No.: US 6,839,524 B2
(45) Date of Patent: Jan. 4, 2005

(54) IMAGE FORMING APPARATUS, NORMAL IMAGE FORMING UNIT, SPECIAL IMAGE FORMING UNIT AND IMAGE FORMING METHOD

(75) Inventors: Shoji Yamaguchi, Nakai-machi (JP); Mario Fuse, Nakai-machi (JP); Hideki Fukunaga, Nakai-machi (JP); Tetsuya Kimura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 77 days.

(21) Appl. No.: 10/246,039

(22) Filed: Sep. 17, 2002

(65) Prior Publication Data

US 2003/0113123 A1 Jun. 19, 2003

(30) Foreign Application Priority Data

Dec. 19, 2001 (JP) .................................... 2001-386142

(51) Int. Cl.[7] ................ G03G 15/04; G03G 15/22; H04N 1/034
(52) U.S. Cl. ............................ 399/2; 347/3; 399/366
(58) Field of Search ....................... 399/2, 6, 366; 347/3

(56) References Cited

U.S. PATENT DOCUMENTS

| | | | | |
|---|---|---|---|---|
| 4,978,593 A | * | 12/1990 | Yin et al. | |
| 5,321,467 A | * | 6/1994 | Tanaka et al. | 399/2 |
| 5,373,350 A | * | 12/1994 | Taylor et al. | 399/2 |
| 6,099,108 A | * | 8/2000 | Weber et al. | |
| 6,385,405 B1 | * | 5/2002 | Kingsland | 399/2 |
| 6,582,039 B2 | * | 6/2003 | Johnson et al. | 399/2 |
| 6,618,563 B2 | * | 9/2003 | Oakeson et al. | 399/2 |

FOREIGN PATENT DOCUMENTS

| | | | | |
|---|---|---|---|---|
| JP | 2000211244 A | * | 8/2000 | B41M/5/00 |
| JP | 2000265077 A | * | 9/2000 | G03G/5/06 |
| JP | 2001270098 A | * | 10/2001 | B41J/2/01 |

* cited by examiner

Primary Examiner—Susan Lee
(74) Attorney, Agent, or Firm—Fildes & Outland, P.C.

(57) ABSTRACT

An image forming apparatus can form an image of a high-precision security information for anti-reproduction. A photosensitive material-coated area in a recording paper is exposed with an exposure unit to form an image of a high-precision security information. Since the image of the security information is thus formed by exposing the photosensitive material, it can be formed as an image incapable of reproduction.

21 Claims, 7 Drawing Sheets

IMAGE FORMING APPARATUS, NORMAL IMAGE FORMING UNIT, SPECIAL IMAGE FORMING UNIT AND IMAGE FORMING METHOD

BACKGROUND OF THE INVENTION

1. Field of the Invention

The present invention relates to an image forming apparatus, a normal image forming unit, a special image forming unit and an image forming method in which an image is formed on a recording medium such as paper. More specifically, it relates to an image forming apparatus, a normal image forming unit, a special image forming unit and an image forming method in which reproduction preventing information can be printed.

2. Description of the Related Art

Various image forming apparatus have currently been used. Typical examples include an inkjet printer and a laser printer.

In the inkjet printer, an image is formed by directly jetting ink droplets to a printing medium. Further, in the inkjet printer, setup of printing with a low or medium precision in the case of printing on plain paper and setup of printing with a relatively high precision in the case of printing on special paper such as coated paper are adapted to be switchable.

Meanwhile, in the laser printer, a charged photosensitive drum is exposed to form an electrostatic latent image thereon, a toner image is formed on the electrostatic latent image by a developing device, and the toner image formed on the photosensitive drum is transferred onto a printing medium to form the image on the printing medium.

To such an image forming apparatus, it is required to impart a function of preventing leak of information caused by reproduction. For example, there is a need to provide reproduction preventing information for preventing reproduction of a document including confidential information on original documents or certified copies of original documents.

As an example of a method of attaining such a function of preventing leak of information, there is a method using latent images and (or) characters. In this method, image formation of a reproduction preventing information is conducted at the same time confidential information is printed on copy-proof paper. In this case, reproduction preventing information is formed using latent images and (or) characters to be concealed on the copy-proof paper. When it is reproduced, the latent image appears on the copy. Consequently, it is obviously found that confidential information is reproduced on the paper.

The method of preventing leak of information using the copy-proof paper is effective for inhibiting reproduction. However, since the reproduction preventing information is formed on an original document or its certified copy (copy-proof paper) as a latent image, it cannot visually be observed (lacking in obviousness). Accordingly, it is impossible to confirm at once whether a document is a true original document (whether it is not a document having been forged or tampered with) or which original document is requested when there are plural original documents.

In this instance, a method in which reproduction preventing information describing a history of information itself to be protected, incapable of reproduction and having obviousness, namely, reproduction preventing information is formed as an image having a high precision on a printing medium is considered to increase an effect of preventing leak of information and to prevent forgery or tampering. However, for forming the high-precision image, it is necessary to employ a printing method using an artwork or the like. In the case of using an artwork, each piece of image information requires the corresponding artwork, and it is impossible to print reproduction preventing information corresponding to each printing medium on demand. Further, in view of a precision of an apparatus, it is impossible to form high-precision security information incapable of reproduction in the printing method using the artwork.

Meanwhile, for forming a high-precision image incapable of reproduction in an inkjet printer, there is a need to further mninimize ink droplets, but it gives rise to a problem that increase of an amount of image information notably decreases a printing speed. Further, it is necessary to use special paper such as coated paper, posing a problem to increase a cost of paper.

In a laser printer, a printing speed is decreased. Moreover, in an electrophotographic system, there is a need to decrease a toner particle size and also attain a high precision in each process. Accordingly, it takes much labor and time to form the high-precision image incapable of reproduction with a laser printer.

SUMMARY OF THE INVENTION

In order to solve such inconveniences, the invention provides an image forming apparatus, a normal image forming unit, a special image forming unit and an image forming method that enable high-precision security information incapable of reproduction and having obviousness to be formed as an image.

The image forming apparatus includes a normal image forming part that forms a normal image on a recording medium, and a special image forming part that forms a special image on the recording medium using a photosensitive material.

The normal image based on image information is formed on the recording medium by the normal image forming part, and the special image is formed on the recording medium by the special image forming part. The normal image here refers to an image formed with a resolution less than a maximum resolution of a general printer of an inkjet system or an electrophotographic system. Meanwhile, the special image is a high-precision image with a high resolution which cannot be reproduced because it is formed using a photosensitive material.

Accordingly, when the recording medium having formed thereon the normal image and the special image is copied, the special image is collapsed and cannot be reproduced, whereby it can be confirmed to be a copy. Further, upon visually observing a special image (security information) of an image-formed recording medium, it can be confirmed at once whether or not the recording medium is a true original or who owns the recording medium.

By the way, the installation of the special image forming part dispenses with an artwork for forming a high-precision image and allows formation of a normal image and a special image on demand.

BRIEF DESCRIPTION OF THE DRAWINGS

Preferred embodiments of the invention will be described in detail based on the following figures, wherein.

DETAILED DESCRIPTION OF THE PREFERRED EMBODIMENTS (First Embodiment)

The image forming apparatus according to the first embodiment of the invention is described below by referring to FIGS. 1 to 6. In an image forming apparatus 10, as shown in FIG. 1, sheet-like paper (plain paper) fed into the apparatus from a sheet feeding tray 12 is transported along a transporting path through a transportation roller 14, and fed out into an output tray 16.

Figure 1:
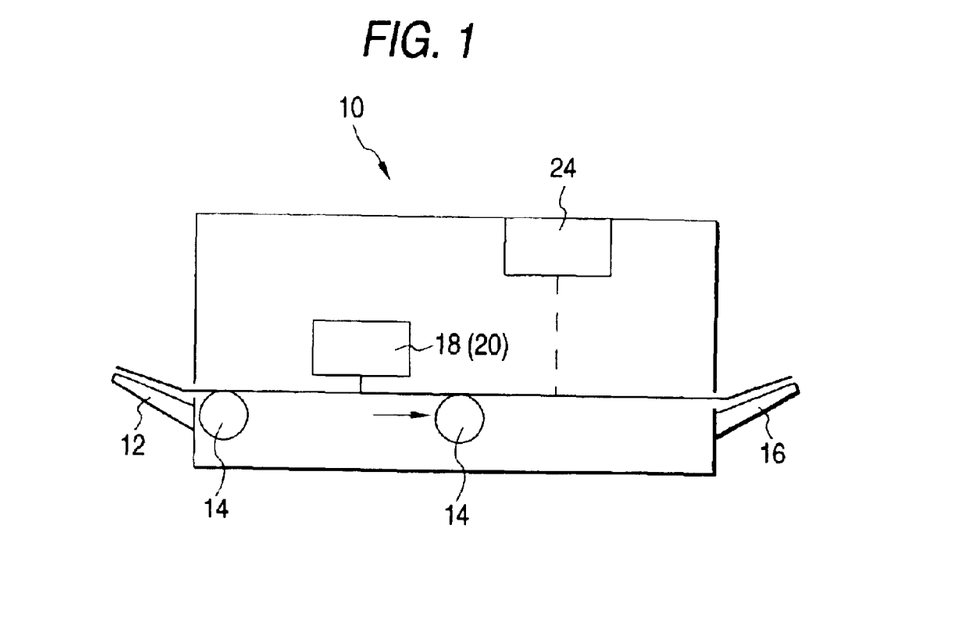
FIG. 1 is a schematic side view of an image forming apparatus according to a first embodiment of the invention.
Figure 2:
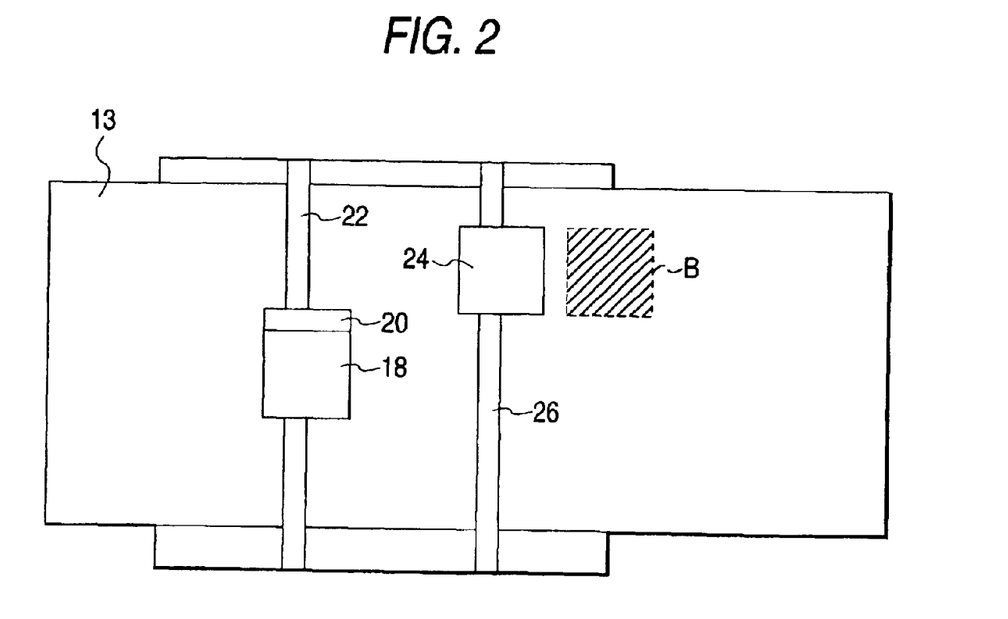
FIG. 2 is a plan view of principal parts of the image forming apparatus according to the first embodiment of the invention.

In the apparatus, as shown in FIGS. 1 and 2, an inkjet recording head 18 that forms a color image (normal image) on paper by jetting ink droplets of YMCK four colors and a photosensitive material injection head 20 (used as a photosensitive material coating device) integrated with the inkjet recording head 18 are mounted upstream along the transporting path.

As shown in FIG. 2, a shaft 22 extending in the paper width direction perpendicular to the paper transporting direction is penetrated through the inkjet recording head 18 such that the inkjet recording head 18 can move in the paper width direction. Accordingly, the inkjet recording head 18 forms the normal image on the paper being transported by jetting ink droplets while moving in the paper width direction. The image formed by the inkjet recording head 18 has a resolution of 600 dpi and a dot diameter of 50 $\mu$m.

Meanwhile, the photosensitive material injection head 20 integrated with the inkjet recording head 18 can also inject the photosensitive material by the inkjet system and be moved in the paper width direction. Consequently, the photosensitive material is injected on paper in a predetermined position of the paper width direction to form an area B coated with the photosensitive material (photosensitive material-coated area) on the paper transported.

It is required that the photosensitive material used here is capable of being injected. Examples thereof include silver halide, azomethine-type, phthalocyanine-type, diazo-type and TeOx-type phase transition materials, a leuco dye and an ampholytic developing/reducing agent. A photo-curing material such as an ultraviolet-curing resin is also available. Especially when the photosensitive material injection head 20 injects the photosensitive material by a thermal inkjet system, it is required to select a photosensitive material having a heat resistance which is so high as not to decrease a sensitivity with heat generated in bubbling.

Moreover, since the photosensitive material is developed with heat energy of a laser beam used in exposure as will be later described, a photosensitive color developer (one incorporated with a color developer) is used. However, in the case of using another developing unit, the photosensitive material is not limited thereto.

An exposure unit 24 using LED or a semiconductor laser array as a light source is mounted downstream in the transporting direction of the inkjet recording head 18 (photosensitive material injection head 20). A shaft 26 installed in the paper width direction perpendicular to the paper transporting, direction is penetrated through the exposure unit 24, and the exposure unit 24 is adapted to be movable in the paper width direction. Consequently, it is possible that the exposure unit is moved in a position corresponding to the photosensitive material-coated area B formed on the paper by the photosensitive material injection head 20 and exposes the photosensitive material-coated area B to form a high-precision image (special image). In the exposure unit 24, an image having a resolution of 1,200 dpi and a dot diameter of 25 $\mu$m can be formed on the paper.

As the exposure unit 24, a semiconductor laser, an Ar laser and a He—Ne laser can be used. Further, a printing speed can be increased by using a multi-laser array in the exposure unit 24.

The function of the thus-constructed image forming apparatus is described below.

When image information and security information are inputted in a control section not shown, paper enters into an apparatus from the paper tray 12, and is transported on the transporting path. When the paper reaches under the inkjet recording head 18, the inkjet recording head 18 jets ink droplets based on a printing signal from the control section while moving in the paper width direction. As a result, a predetermined image is formed on paper 13 with a resolution of 600 dpi. For example, an image shown in FIG. 3A can be formed. In the drawing, a circle 28 shows a range of a dot with 600 dpi and a diameter of 50 $\mu$m.

Figure 4:
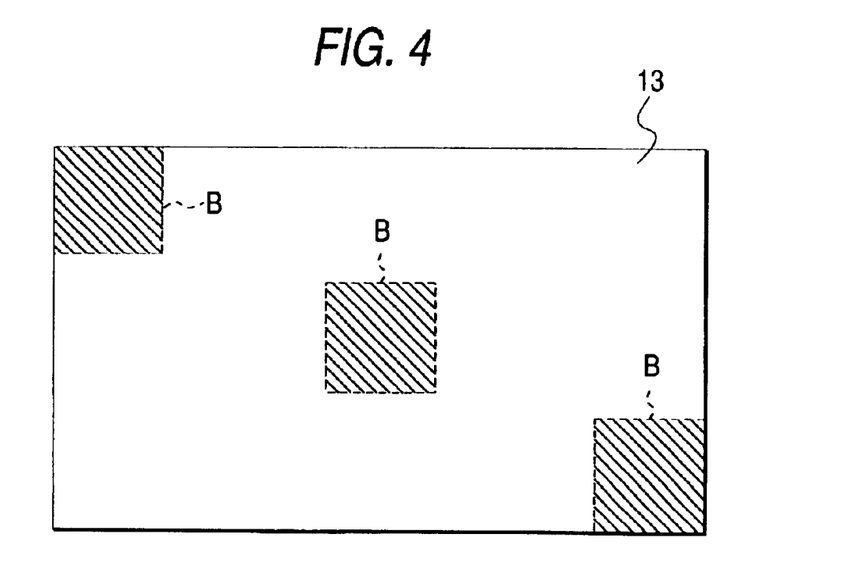
FIG. 4 is a plan view of an image receiving area formed on paper.

At this time, the photosensitive material injection head 20 injects the photosensitive material on a predetermined position to coat the predetermined position of the paper 13 with the photosensitive material. That is, as shown in FIG. 4, the photosensitive material-coated area B can be formed on any position of the paper by adjusting the injection timing.

The paper 13 coated with the photosensitive material (having formed thereon the photosensitive material-coated area B) is transported downstream to reach an exposure position. Here, the exposure unit 24 is moved to a position corresponding to the photosensitive material-coated area B along the shaft 26. According to the timing in which the photosensitive material-coated area B of the paper reaches under the exposure unit 24, the exposure unit 24 exposes the photosensitive material-coated area B of the paper based on the security information inputted from the control section. As a result, high-precision characters and the like having a resolution of at least 1,200 dpi which exceeds a maximum resolution of a general copying machine are formed on the photosensitive material-coated area B coated with the photosensitive material (photosensitive color developing agent). For example, an image shown in FIG. 3B can be formed. In the drawing, a circle 30 indicates a range of a dot with 1,200 dpi and a diameter of 25 $\mu$m.

Thus, a normal image (resolution 600 dpi, dot diameter 50 $\mu$m) and a high-precision special image (for example, resolution 1,200 dpi, dot diameter 25 $\mu$m) can be formed on the paper without the use of an artwork. Especially, an image of security information is formed by exposing the photosensitive materialcoated area B, so that it can be recorded as a high-precision special image having a resolution of at least 1,200 dpi.

Figure 3A:
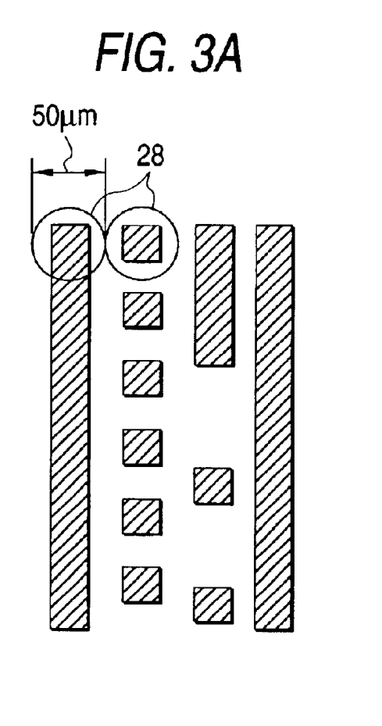
FIG. 3A is a view illustrating an image formed with an inkjet recording head of an image forming apparatus.
Figure 3B:
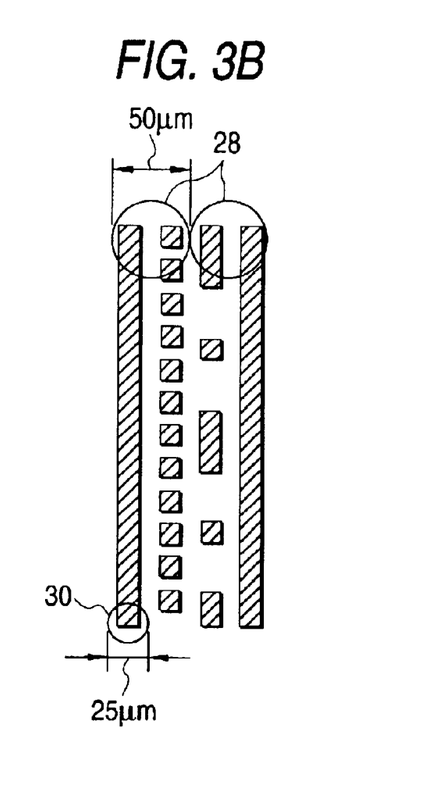
FIG. 3B a view illustrating an image formed by exposure in the first embodiment of the invention.

As a result, when the paper with the image of the security information recorded is reproduced, the range of the circle 28 in FIG. 3(B) is formed as 1 dot because a resolution of a copying machine is approximately 600 dpi, and a pattern of a solid line and a broken line formed with at least 1,200 dpi is collapsed and cannot be reproduced. Accordingly, upon visually observing a pattern on the paper, it can be confirmed whether or not it is an original.

In this case, the security information is formed with a resolution of 1,200 dpi on condition that the resolution of the copying machine is 600 dpi. However, when a resolution of a copying machine is increased to 1200 dpi or 2,400 dpi in future, a resolution of a special image formed by exposure can be increased to 2,400 dpi or 4,800 dpi to exhibit the foregoing effect of preventing reproduction.

In this manner, the high-precision security information is surely incapable of reproduction by making the resolution of the special image formed by the exposure unit 24 higher than, preferably at least twice as high as, the resolution of the image by the inkjet recording head 18.

Figure 5:
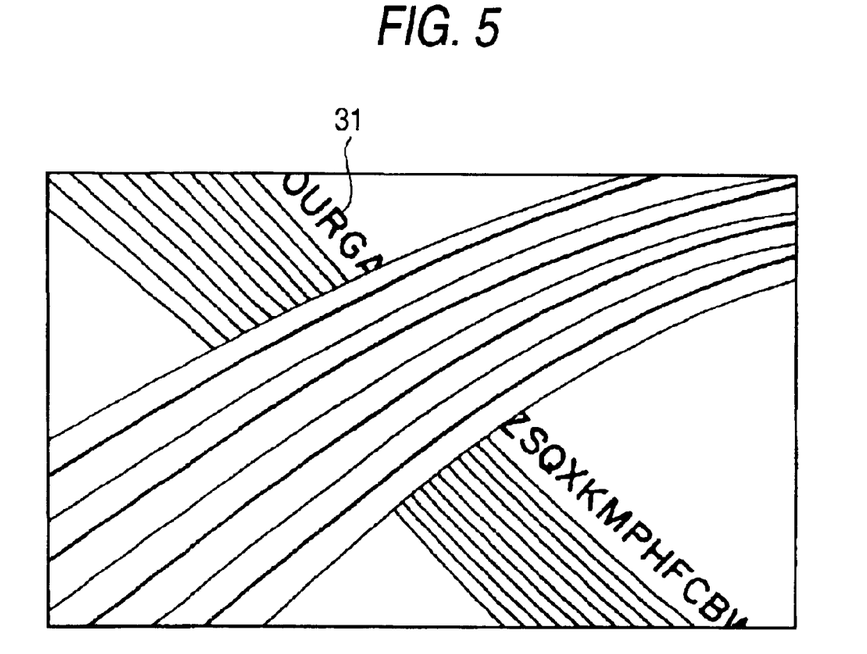
FIG. 5 is an enlarged schematic view showing an image of security information formed by the image forming apparatus according to the first embodiment of the invention.
Figure 6:
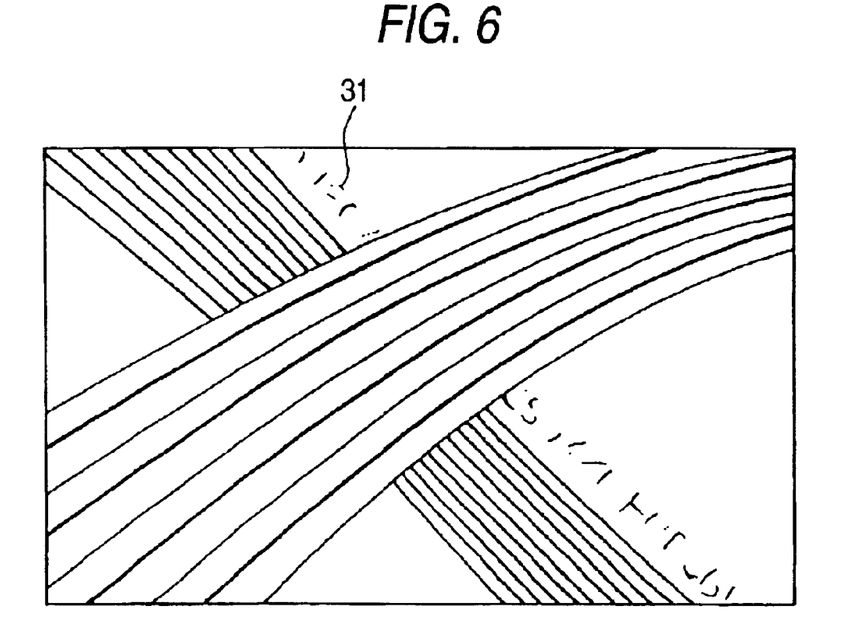
FIG. 6 is an enlarged schematic view showing an image obtained by reproducing a portion corresponding to the security information shown in FIG. 5.

FIGS. 3A and 3B show the image example of the pattern as the security information. Meanwhile, the security information can be alphabetic letter information. FIG. 5 is an enlarged view of its specific example. In the drawing, the security information is formed on paper by an alphabet 31 with the exposure unit 24. The alphabet 31 is formed with a minimum height of 0.2 mm and a line width of 20 to 30 $\mu$m. When this is reproduced with an ordinary copying machine (resolution 600 dpi), the alphabet 31 cannot be reproduced as shown in FIG. 6, and cannot be recognized. Thus, it can readily be confirmed to be a copy (not an original).

Further, when the security information is formed as an image of letter information, a source of a document can immediately be confirmed by including a recording person, a recording time, a recording device and the like in the letter information.

Alternatively, security information may be formed in the special image through means other than with alphanumeric characters. For example, fine lines, a latent image adapted such that an image appears by tilting the paper and optical patterns may also be used. Further, one-dimensional or two-dimensional code information capable of realizing assurance of originality and integration into electronic information is considered. Still further, an image having a high effect of preventing forgery with obviousness can also be formed by injecting a hologram forming material from the photosensitive material injection head 20.

The effect of preventing forgery can be increased by properly selecting the security information and the photosensitive material.

Thus, with the image forming apparatus 10 of this embodiment, the image of the high-precision security information incapable of reproduction can be formed on the paper (printing medium) by exposing the photosensitive material to greatly improve the security of the printing medium.

Further, since the image of the high-precision security information is formed on the paper by exposing the photosensitive material, there is no need to use an artwork that forms the high-precision image incapable of reproduction, and it can immediately be printed out on demand.

The high-precision security information can be formed by coating paper which can be plain paper with the photosensitive material to form the photosensitive material-coated area and exposing the photosensitive material-coated area. Thus, it is unnecessary to use special paper such as coated paper for forming the image of the high-precision security information, whereby a running cost can be reduced.

Since the image of the security information is formed on the paper by forming the photosensitive material-coated area B only in a predetermined range of the paper and exposing it, a portion on which a high-precision image is formed is limited, making it possible to minimize the reduction of the printing speed.

Since the high-precision security information having the obviousness can be printed, it is possible to protect a copyright or ensure originality. Consequently, a trading card can be printed out with the image forming apparatus 10, accordingly, it may be possible to expand a printing market in the field of entertainment.

Moreover, since originality of a document printed out can be ensured and an effect of preventing forgery is high, a printing service of official documents such as a certified copy of family register, a resident card, and an insurance certificate on demand can be realized by installing the image forming apparatus 10 connected on line in, for example, a convenience store.

In this embodiment, the development of the special image through the laser exposure by incorporating the color developing agent in the photosensitive material has been described. However, the thermal development is also available, or the development may be conducted by coating the photosensitive material with a developing solution or a fixing solution.

(Second Embodiment)

An image forming apparatus according to a second embodiment of the invention is described below. To the same components as in the first embodiment, the same reference numerals are allotted, and the detailed description thereof is omitted. By the way, since the second embodiment and the first embodiment are different only with respect to a portion coated with the photosensitive material, only the very portion is described.

Figure 7:
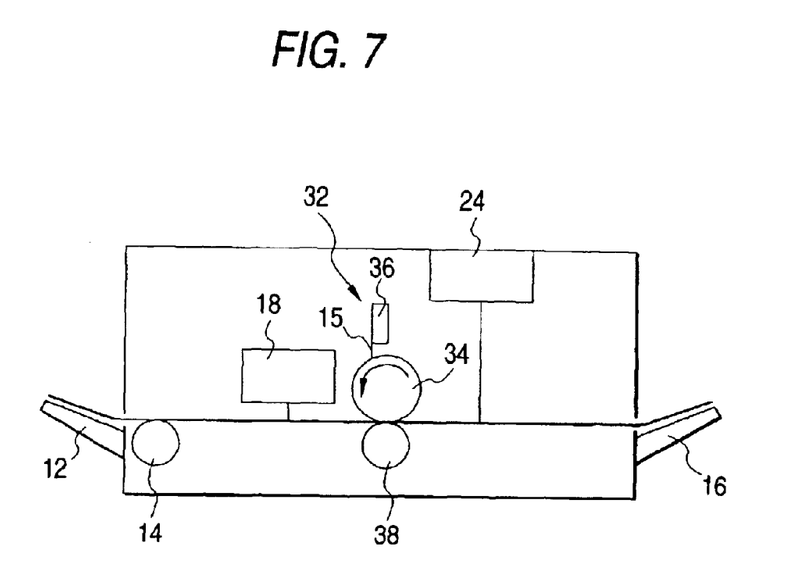
FIG. 7 is a schematic side view of the image forming apparatus according to the second embodiment of the invention.
Figure 8:
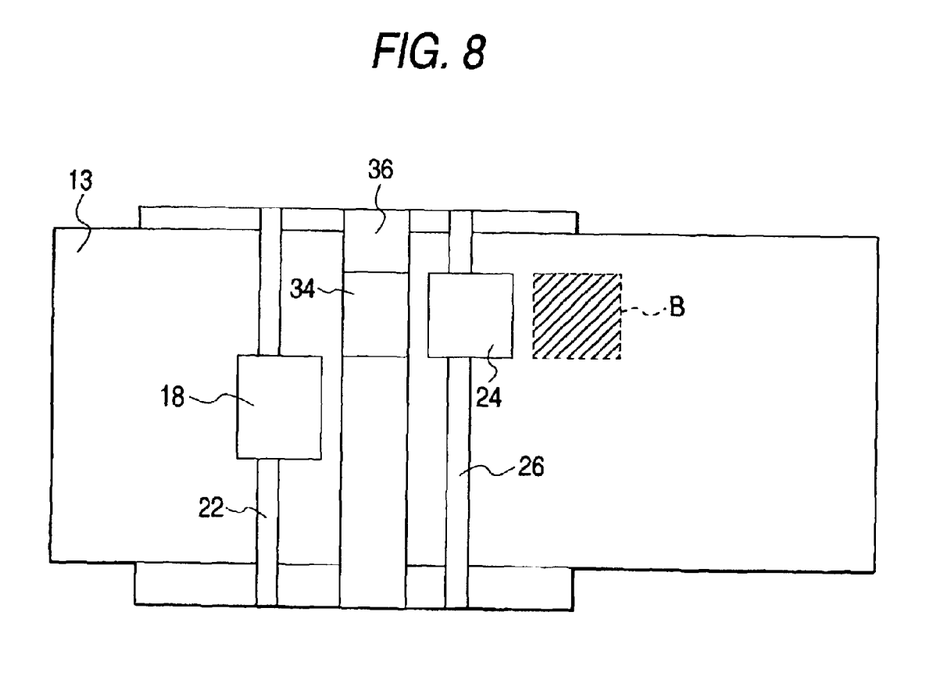
FIG. 8 is a plan view of principal parts of the image forming apparatus according to the second embodiment of the invention.

That is, as shown in FIGS. 7 and 8, another embodiment of a photosensitive material coating device 32, instead of the photosensitive material injection head 20 in the first embodiment, is mounted downstream in the transporting direction of the inkjet recording head 18.

The photosensitive material coating device 32 includes a rotary drum 34, a supply device 36 that coats a predetermined position of the rotary drum with a photosensitive material 15 and a transfer roller 38 that transfers the photosensitive material 15 from the rotary drum 34 to a paper by pressing the paper against the rotary drum 34.

The supply device 36 injects the photosensitive material 15 on the rotary drum 34 to coat the rotary drum 34 with the photosensitive material 15.

The function of the image forming apparatus having such a construction is described below.

The photosensitive material 15 is injected from the supply device 36 with a predetermined timing to form the photosensitive material-coated area on the predetermined position of the rotary drum 34. Further, the paper on which the color image is formed with the inkjet recording head 18 is nipped between the rotary drum 34 and the transfer roller 38 to transfer the photosensitive material 15 on the rotary drum 34 onto the paper and form the photosensitive materialcoated area B on the predetermined position of the paper. The photosensitive material-coated area B formed on the paper is exposed by an exposure unit 24 to form a high-precision image on the paper.

As a result, the same functional effect as in the first embodiment can be brought forth.

By the way, in this embodiment, the photosensitive material 15 is transferred onto the paper from the rotary drum 34, which is not critical, though. For example, a coating method with a brush is also available.

Further, the photosensitive material may be a sheet-like material such as a photosensitive film or photosensitive paper, and it may be adhered to the paper from the rotary drum 34.

(Third Embodiment)

An image forming apparatus according to a third embodiment of the invention is described below. To the same components as in the first embodiment, the same reference numerals are allotted, and the detailed description thereof is omitted. In this embodiment, the image forming apparatus is applied to an electrophotographic apparatus.

Figure 9:
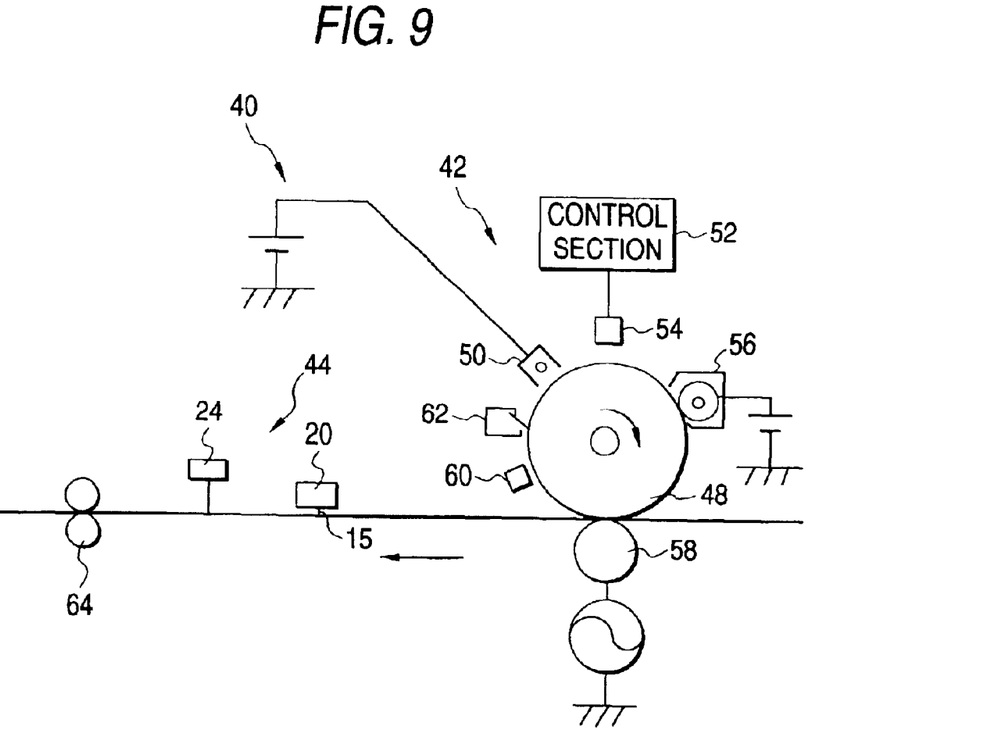
FIG. 9 is a schematic side view of the image forming apparatus according to the third embodiment of the invention.

As shown in FIG. 9, an image forming apparatus 40 includes a first image forming unit 42 mounted upstream in a paper transporting direction and a second image forming unit 44 mounted downstream in the paper transporting direction.

In the first image forming unit 42, a photosensitive drum 48 is mounted upstream in the paper transporting direction. Further, a charge unit 50, an exposure device 54 that conducts exposure based on image information from a control section 52, a developing device 56 that forms a toner image on a latent image formed on the photosensitive drum 48 by the exposure device 54, a transfer device 58 that transfers the toner image formed on the photosensitive drum by the developing device 56 onto the paper, a charge removal device 60 that removes a charge remaining on the surface of the photosensitive drum after the transfer and a cleaning device 62 that removes the toner remaining on the surface of the photosensitive drum are mounted along a rotational direction of the photosensitive drum 48.

Moreover, a fixing portion 64 that fixes the image formed with the first image forming unit 42 on the paper is mounted downstream in a transporting direction of a second image forming unit 44 to be described later.

The second image forming unit 44 includes a photosensitive material injection head 20 which can move in a paper width direction and an exposure unit 24 as in the first embodiment.

The image forming apparatus 40 having such a construction brings forth the same functional effect as in the first embodiment.

Since the first image forming unit 42 is an electrophotographic device, a high speed is available in comparison to an inkjet printing method. Accordingly, it is appropriate for making office documents on demand at high speed. Especially, it can cope, at once, with making office documents requiring confidentiality and originality.

(Fourth Embodiment)

Figure 10:
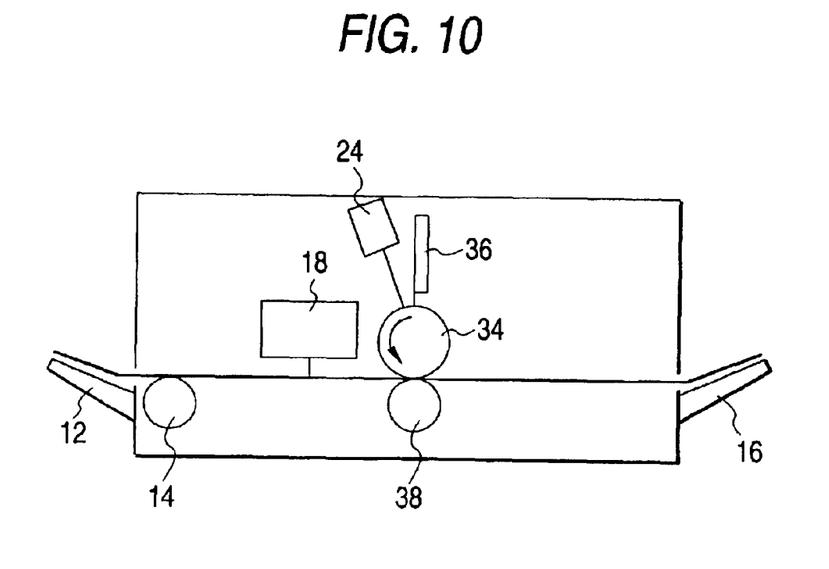
FIG. 10 is a schematic side view of the image forming apparatus according to the fourth embodiment of the invention.

An image forming apparatus according to a fourth embodiment of the invention is described below. To the same components as in the second embodiment, the same reference numerals are allotted, and the detailed description thereof is omitted. A difference between this embodiment and the second embodiment is that an image is formed by exposing a photosensitive material 15 on a rotary drum 34 and is transferred onto paper. Only this difference is described below.

In an image forming apparatus 70, as shown in FIG. 10, an exposure unit 24 is mounted such that the photosensitive material formed on the rotary drum 34 of a coating device 32 can be exposed with a laser beam.

A function of the thus-constructed image forming apparatus 70 is described below.

First, a photosensitive material-coated area formed on the rotary drum 34 is exposed to a laser beam by the exposure unit 24 to form high-precision security information on the rotary drum 34 in advance. When a paper 13 on which a normal image is formed with an inkjet recording head 18 is nipped between the rotary drum 34 and a transfer roller 38 in this state, the rotary drum 34 is rotated synchronously with the paper 13, and the photosensitive material 15 on the rotary drum 34 is adhered to a predetermined position of the paper, whereby high-precision security information is formed on the paper.

The image forming apparatus 70 of this embodiment also brings forth the same functional effect as in the second embodiment. Moreover, since the high-precision image is formed in advance on the photosensitive material of the rotary drum 34, there is an effect that a transporting speed (printing speed) of the paper is not decreased for forming the high-precision image.

(Fifth Embodiment)

An image forming apparatus according to a fifth embodiment of the invention is described below. To the same components as in the first to fourth embodiments, the same reference numerals are allotted, and the detailed description thereof is omitted. In this embodiment, only a portion of forming a high-precision image is described.

Figure 11A:
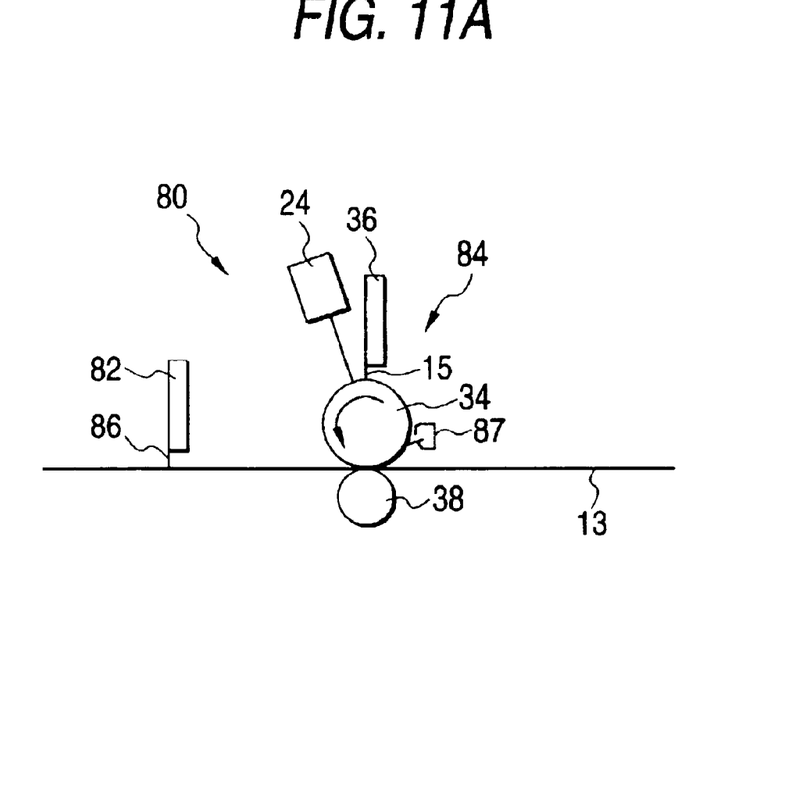
FIG. 11A is a side view of principal parts of the image forming apparatus according to the fifth embodiment of the invention.

As shown in FIG. 11A, an image forming apparatus 80 includes, along a transporting path, an image receiving material forming portion 82 located upstream in a paper transporting direction (refer to an arrow) to coat a predetermined position of paper with an image receiving material, and an image transfer portion 84 located downstream in a transporting direction of the image receiving material forming portion 82 to transfer a high-precision image formed on the photosensitive material onto the image receiving material.

In the image receiving material forming position 82, the image receiving material 86 is coated on a predetermined area of the paper being transported to form an image receiving area (image receiving material-coated area) C on the paper.

The image transfer portion 84 embodies both a photosensitive material coating device and an exposure unit. The image transfer portion 84 includes a rotary drum 34, a supply device 36 that injects a photosensitive material 15 on the rotary drum, an exposure unit 24 that exposes the coated photosensitive material 15 to form the high-precision image, a transfer roller 38 pressed against the rotary drum 34 at a predetermined nip pressure to transfer the high-precision image formed on the photosensitive material onto the image receiving material-coated area C of the paper, and a photosensitive material removing device 87 that removes the photosensitive material 15 after transferring the image from the surface of the rotary drum.

Although a portion of forming a normal image is not described, the inkjet system described in the first and second embodiments or the electrophotographic system described in the third embodiment is available.

The function of the thus-constructed image forming apparatus 80 is described below.

Figure 11B:
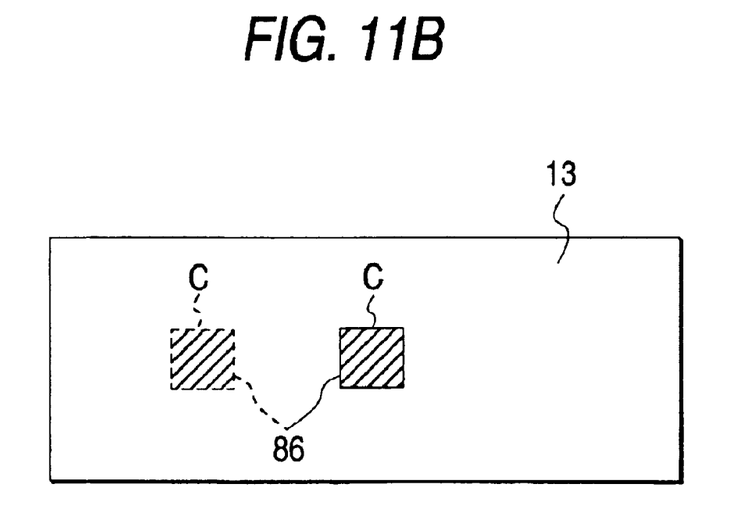
FIG. 11B a view illustrating an image receiving area and an image transfer area formed on paper.

When the paper having the normal image formed thereon reaches the image receiving material forming position 82, the image receiving material is coated on a predetermined position of the paper to form the image receiving material-coated area C (refer to a portion drawn with a broken line in FIG. 11B).

On the other hand, the photosensitive material 15 is injected on the rotary drum 34 with a supply device 36 to form the photosensitive material-coated area corresponding to the image receiving material-coated area C, and the photosensitive material-coated area is exposed with the exposure unit 24 to form an image of high-precision security information. The rotary drum 34 is rotated synchronously with the paper, and the paper is nipped between the rotary drum 34 and the transfer roller 38, whereby the image receiving material-coated area C of the paper is overlaid on the photosensitive material-coated area of the rotary drum 34 to transfer the high-precision image onto the image receiving material-coated area C of the paper. By the way, the photosensitive material 15 after transferring the image is removed from the surface of the rotary drum by a photosensitive material removing device 87.

The image forming apparatus 80 according to this embodiment also brings forth the same functional effect as in the first to fourth embodiments. Further, a material used in an ordinary silver salt printer can be used as a photosensitive material, whereby the image forming apparatus of this embodiment can easily be constructed.

(Sixth Embodiment)

An image forming apparatus according to a sixth embodiment of the invention is described below. To the same components as in the first to fifth embodiments, the same reference numerals are allotted, and the detailed description thereof is omitted.

Figure 12:
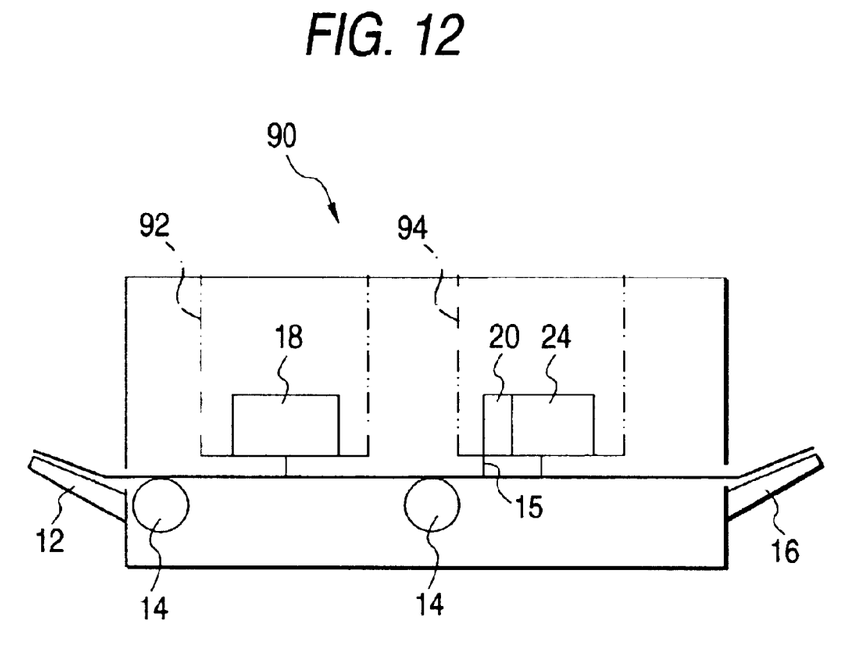
FIG. 12 is a schematic side view of the image forming apparatus according to the sixth embodiment of the invention.

As shown in FIG. 12, a first image forming unit 92 having an inkjet recording head 18 that forms a normal image and a second image forming unit 94 having a photosensitive material injection head 20 and an exposure unit 24 are adapted to be easily attached to, or detached from, an image forming apparatus 90.

When either the first image forming unit 92 or the second image forming unit 94 is out of order owing to an accident, the image forming unit out of order can be exchanged to prolong the life of the overall apparatus. Further, since only the unit out of order can be exchanged, it is possible to effectively use resources. Consequently, the image forming apparatus can be provided at low cost.

When a use frequency or a structural life of each image forming unit can be predicted, only an image forming unit having a short life and a high use frequency can be adapted to be easily attached to, or detached from, the apparatus 90 to bring forth the same functional effect.

Moreover, in each image forming unit, parts heavily worn out in particular are adapted to be easily exchangeable, whereby the same effect can be brought forth.

(Seventh Embodiment)

An image forming apparatus according to a seventh embodiment of the invention is described below. To the same components as in the first to sixth embodiments, the same reference numerals are allotted, and the detailed description thereof is omitted.

Figure 13:
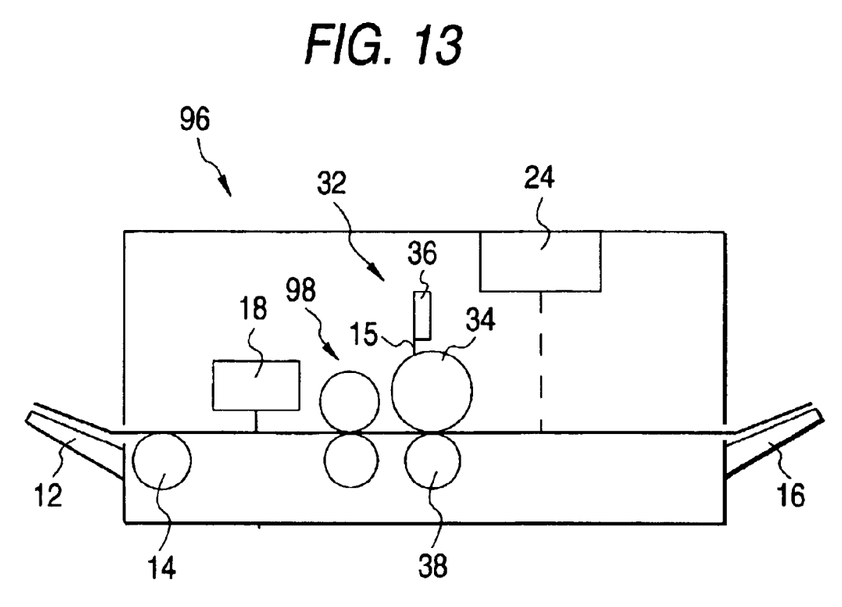
FIG. 13 is a schematic side view of the image forming apparatus according to the seventh embodiment of the invention.

In an image forming apparatus 96, as shown in FIG. 13, a seal adhesion device 98 that can adhere a seal having a high security effect, such as a hologram, to a paper is mounted on a transporting path between an inkjet recording head 18 and a photosensitive material coating device 32.

In the thus-constructed image forming apparatus 96, a photosensitive material 15 is coated on the seal of the paper to which the seal has been adhered with the seal adhesion device 98 by a photosensitive material coating device 32, and this photosensitive material 15 is exposed with an exposure unit 24 to form a high-precision image on the seal.

Consequently, the same effect as in the first embodiment can be brought forth to prevent forgery (reproduction) more effectively.

It is also possible that the seal adhesion device 98 may also act as a coating device, wherein a hologram having a photosensitive material coated thereon is adhered to paper with the seal adhesion device and the photosensitive material on the seal is exposed with the exposure unit 24 to form a high-precision image. In this case, there is a merit that the photosensitive material coating device 32 is dispensed with.

In the embodiments of the invention, an inkjet recording system and an electrophotographic system have been described in forming the normal image. A heat transfer system, a heat sublimation system, a silver salt photographic system and a stamper are also available.

Further, the embodiments have been described using plain paper as a printing medium, which is not critical, though. For example, coated paper, a film and an OHP sheet are also available. Moreover, sheet-like paper has been employed, but rolled (long) paper is also available.

In addition, as a high-precision image forming part, an inkjet recording system, an electrophotographic system, a heat transfer system, a heat sublimation system, a silver salt photographic system and a stamper are also available.

The invention can form the high-precision image incapable of reproduction on a recording medium by the special image forming part. Accordingly, when the security information is formed as the special image, it is impossible to reproduce the security information, and the recording medium is obviously found to be a copy. Further, upon observing the special image of the recording medium, it can easily be confirmed whether or not the recording medium is an original. Still further, the high-precision special image can be formed by the special image forming part without the need of an artwork, whereby an image requiring originality can be formed on the recording medium on demand.

What is claimed is:

1. An image forming apparatus comprising:
    a normal image forming part that forms a normal image on a recording medium; and
    a special image forming part that forms a special image on the recording medium using a photosensitive material,
    wherein the special image forming part comprises a coating device that coats the recording medium with the photosensitive material, and an exposure unit that exposes the photosensitive material to form the special image on the recording medium.

2. The image forming apparatus as claimed in claim 1, wherein the special image forming part comprises a transfer part, a coating device that coats a transfer member with the photosensitive material, and an exposure unit that exposes the photosensitive material to form the special image on the transfer member, the transfer part transferring the special image onto the recording medium.

3. The image forming apparatus as claimed in claim 1, wherein the coating device adopts an inkjet printing system.

4. The image forming apparatus as claimed in claim 1, wherein the exposure unit comprises a semiconductor laser array.

5. The image forming apparatus as claimed in claim 1, wherein a resolution of the special image is higher than a resolution of the normal image.

6. The image forming apparatus as claimed in claim 1, wherein a resolution of the special image is at least twice as high as a resolution of the normal image.

7. The image forming apparatus as claimed in claim 1, wherein a resolution of the special image is at least 1,200 dpi.

8. The image forming apparatus as claimed in claim 1, wherein a resolution of the special image, a dot diameter is 25 $\mu$m or less.

9. The image forming apparatus as claimed in claim 1, wherein the special image includes security information.

10. The image forming apparatus as claimed in claim 9, wherein the security information comprises any of a very small letter, a latent image, fine lines, an optical pattern and a code or a combination thereof.

11. The image forming apparatus as claimed in claim 9, wherein the security information comprises any of information about a recording time, information about a recording device or information about a recording person or a combination thereof.

12. The image forming apparatus as claimed in claim 1, wherein the normal image forming parts adopts any of an inkjet printing system, an electrophotographic printing system, an image transfer printing system and a sublimation printing system or a combination thereof.

13. The image forming apparatus as claimed in claim 1, comprising:
   a normal image forming unit having the normal image forming part; and
   a special image forming unit having the special image forming part which is attached to, or detached from, the normal image forming unit.

14. The image forming apparatus as claimed in claim 1, wherein the coating device comprises a photosensitive material injection head.

15. The image forming apparatus as claimed in claim 1, wherein the coating device comprises:
   a rotary drum;
   a supply device that coats a predetermined position of the rotary drum with a photosensitive material; and
   a transfer roller that transfers the photosensitive material from the rotary drum to the recording medium by pressing the recording medium against the rotary drum.

16. The image forming apparatus as claimed in claim 15, wherein the exposure unit is mounted relative to the rotary drum such that the photosensitive material formed on the rotary drum is exposed to a light source from the exposure unit to form high precision security information on the rotary drum.

17. The image forming apparatus as claimed in claim 16, further including:
   an image receiving material forming portion located upstream of the coating device in a recording medium transporting direction to coat a predetermined position of recording medium with an image receiving material; and
   wherein the coating device transfers the high precision security information from the rotary drum onto the recording medium coated with the image receiving material, and the photosensitive material removing device removes the photosensitive material thereafter.

18. The image forming apparatus as claimed in claim 15, comprising:
   a seal adhesion device located upstream of the coating device, wherein the seal adhesion device adheres a seal to the recording medium and the coating device transfers the photosensitive material to the seal from the drum.

19. The image forming apparatus as claimed in claim 1 wherein the coating device comprises a hologram adhesion device wherein the hologram adhesion device adheres a hologram to the recording medium with the photosensitive material disposed on the hologram.

20. An image forming method comprising:
   receiving a normal image and a special image transmitted through an electric circuit;
   forming the normal image on a recording medium, the normal image having a predetermined first resolution;
   coating a portion of the recording medium with a photosensitive material; and
   exposing the photosensitive material to a light source to form the special image, the special image having a predetermined second resolution higher than the first resolution.

21. The image forming method of claim 20 wherein the second resolution is at least twice as high as the first resolution.

* * * * *